US012003366B2

(12) United States Patent
Reid et al.

(10) Patent No.: US 12,003,366 B2
(45) Date of Patent: *Jun. 4, 2024

(54) SYSTEM AND METHOD FOR SDN ORCHESTRATION VALIDATION

(71) Applicant: AT&T Intellectual Property I, L.P., Atlanta, GA (US)

(72) Inventors: Dylan Reid, Atlanta, GA (US); Joseph Soryal, Glendale, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/939,072

(22) Filed: Sep. 7, 2022

(65) Prior Publication Data
US 2023/0006879 A1   Jan. 5, 2023

Related U.S. Application Data

(63) Continuation of application No. 16/541,673, filed on Aug. 15, 2019, now Pat. No. 11,469,942.

(51) Int. Cl.
*H04L 41/0806* (2022.01)
*G06F 9/455* (2018.01)
*H04L 41/00* (2022.01)
*H04L 41/06* (2022.01)
*H04L 41/0893* (2022.01)
*H04L 43/50* (2022.01)

(52) U.S. Cl.
CPC .......... *H04L 41/0806* (2013.01); *G06F 9/455* (2013.01); *H04L 41/06* (2013.01); *H04L 41/0893* (2013.01); *H04L 41/20* (2013.01); *H04L 43/50* (2013.01)

(58) Field of Classification Search
CPC . H04L 41/0806; H04L 41/06; H04L 41/0893; H04L 41/20; H04L 43/50; G06F 9/455
See application file for complete search history.

(56) References Cited

U.S. PATENT DOCUMENTS 8,397,298 B2   3/2013   Macwan et al.
9,396,334 B1   7/2016   Ivanov et al.
(Continued)

OTHER PUBLICATIONS

"File hashing, checksum software, verify CRC MOS SHA values", retrieved from https://www.peazip.org/verify-checksum-has.html; accessed Apr. 12, 2021, Feb. 14, 2015, 3 pages.
(Continued)

*Primary Examiner* — Blake J Rubin
(74) *Attorney, Agent, or Firm* — Guntin & Gust, PLC; Dana B. LeMoine

(57) ABSTRACT

A system includes an orchestrator for a software-defined network and configured to receive a request for operation of the software-defined network, a software-defined network controller in communication with the orchestrator through a northbound application programming interface, at least one network element in communication with the software defined network controller though a southbound application programming interface, and a mutable network element configured to receive the request and instantiate a virtual function within the mutable network element to test the at least one network element in accordance with the request.

20 Claims, 12 Drawing Sheets

(56) References Cited

U.S. PATENT DOCUMENTS

| | | |
|---|---|---|
| 9,600,386 B1 | 3/2017 | Thai et al. |
| 9,712,406 B2 | 7/2017 | Chu et al. |
| 9,780,909 B2 | 10/2017 | Wood et al. |
| 9,843,624 B1 | 12/2017 | Taaghol et al. |
| 9,853,914 B1 | 12/2017 | Felstaine et al. |
| 10,063,415 B1 | 8/2018 | Kanakarajan |
| 10,083,026 B1 | 9/2018 | Venkata et al. |
| 10,116,514 B1 | 10/2018 | Felstaine et al. |
| 10,121,003 B1 | 11/2018 | Adams |
| 10,200,274 B1 | 2/2019 | Suryanarayana et al. |
| 10,305,962 B1 | 5/2019 | Skowronski |
| 10,353,798 B1 | 7/2019 | Diac et al. |
| 10,425,320 B2 | 9/2019 | Nistor et al. |
| 10,771,329 B1 | 9/2020 | Fewtrell |
| 10,805,171 B1 | 10/2020 | Anwer et al. |
| 10,846,208 B1 | 11/2020 | Lakshmi et al. |
| 11,018,937 B2* | 5/2021 | Smith .................. H04L 45/64 |
| 11,706,127 B2* | 7/2023 | Michael .................. H04L 45/12 370/252 |
| 2008/0159506 A1 | 7/2008 | Raheja |
| 2010/0115342 A1 | 5/2010 | Shigeta et al. |
| 2012/0331441 A1 | 12/2012 | Adamson |
| 2013/0176857 A1 | 7/2013 | Turner et al. |
| 2013/0297769 A1 | 11/2013 | Chang et al. |
| 2014/0006570 A1 | 1/2014 | Loos et al. |
| 2014/0281715 A1 | 9/2014 | Khan et al. |
| 2014/0337674 A1* | 11/2014 | Ivancic .................. H04L 41/342 714/43 |
| 2014/0368665 A1 | 12/2014 | Lirette et al. |
| 2015/0006733 A1 | 1/2015 | Khan et al. |
| 2015/0063166 A1 | 3/2015 | Sif et al. |
| 2015/0188772 A1 | 7/2015 | Gasparakis |
| 2015/0205979 A1 | 7/2015 | Dong et al. |
| 2015/0234725 A1 | 8/2015 | Cillis et al. |
| 2015/0263894 A1 | 9/2015 | Kasturi et al. |
| 2015/0295761 A1 | 10/2015 | Wang et al. |
| 2015/0296531 A1 | 10/2015 | Xue |
| 2015/0381515 A1 | 12/2015 | Mattson et al. |
| 2016/0028598 A1 | 1/2016 | Khakpour et al. |
| 2016/0043944 A1 | 2/2016 | Felstaine et al. |
| 2016/0182619 A1 | 6/2016 | Mann |
| 2016/0197831 A1 | 7/2016 | De Foy et al. |
| 2016/0224460 A1 | 8/2016 | Bryant et al. |
| 2016/0232078 A1* | 8/2016 | Biswas ............... G06F 11/3664 |
| 2016/0277234 A1 | 9/2016 | Amulothu et al. |
| 2016/0301579 A1 | 10/2016 | Djukic et al. |
| 2016/0350683 A1 | 12/2016 | Bester et al. |
| 2017/0048115 A1 | 2/2017 | Wang |
| 2017/0078922 A1 | 3/2017 | Raleigh et al. |
| 2017/0141974 A1 | 5/2017 | Lahiri |
| 2017/0180233 A1 | 6/2017 | Nistor et al. |
| 2017/0195257 A1 | 7/2017 | Annaluru et al. |
| 2017/0199751 A1 | 7/2017 | Sama et al. |
| 2017/0222878 A1* | 8/2017 | Jacquin ............... H04L 41/0866 |
| 2017/0237667 A1 | 8/2017 | Wang |
| 2017/0244611 A1 | 8/2017 | Wang |
| 2017/0250870 A1 | 8/2017 | Zhao |
| 2017/0257324 A1 | 9/2017 | Balmakhtar et al. |
| 2017/0318043 A1 | 11/2017 | Shin et al. |
| 2017/0364681 A1 | 12/2017 | Roguine et al. |
| 2018/0048525 A1 | 2/2018 | Karasaridis et al. |
| 2018/0049051 A1 | 2/2018 | Doshi et al. |
| 2018/0121335 A1 | 5/2018 | Cillis et al. |
| 2018/0123911 A1* | 5/2018 | Zhang .................. H04L 41/5009 |
| 2018/0191597 A1 | 7/2018 | Nageshappa et al. |
| 2018/0199218 A1 | 7/2018 | Ashrafi |
| 2018/0204234 A1 | 7/2018 | Hermoni et al. |
| 2018/0287902 A1 | 10/2018 | Chitalia et al. |
| 2018/0307522 A1* | 10/2018 | Wu .................. H04L 41/0886 |
| 2018/0316543 A1 | 11/2018 | Hwang |
| 2018/0337848 A1* | 11/2018 | Bhaskar .................. H04L 45/14 |
| 2018/0359688 A1 | 12/2018 | An et al. |
| 2018/0376338 A1 | 12/2018 | Ashrafi |
| 2019/0028350 A1 | 1/2019 | Yeung et al. |
| 2019/0052548 A1 | 2/2019 | Kojukhov et al. |
| 2019/0052549 A1 | 2/2019 | Duggal et al. |
| 2019/0075133 A1 | 3/2019 | Chen et al. |
| 2019/0082004 A1 | 3/2019 | Bosch et al. |
| 2019/0089742 A1 | 3/2019 | Hill |
| 2019/0102549 A1 | 4/2019 | Krylov et al. |
| 2019/0104047 A1* | 4/2019 | Tejaprakash ............ H04L 43/50 |
| 2019/0124589 A1 | 4/2019 | Bogineni et al. |
| 2019/0132211 A1 | 5/2019 | Yeung et al. |
| 2019/0173764 A1* | 6/2019 | Di Martino ........... H04L 41/122 |
| 2019/0174498 A1 | 6/2019 | Samdanis et al. |
| 2019/0190785 A1 | 6/2019 | Power et al. |
| 2019/0199616 A1 | 6/2019 | Jones et al. |
| 2019/0215305 A1 | 7/2019 | Monshizadeh et al. |
| 2019/0236485 A1 | 8/2019 | Stanley, III et al. |
| 2019/0259097 A1 | 8/2019 | Raleigh et al. |
| 2019/0268777 A1 | 8/2019 | Simon et al. |
| 2019/0334909 A1 | 10/2019 | Schmitt et al. |
| 2019/0342187 A1 | 11/2019 | Zavesky et al. |
| 2019/0386891 A1 | 12/2019 | Chitalia et al. |
| 2020/0029139 A1* | 1/2020 | García Osma ...... G06F 16/1824 |
| 2020/0067772 A1 | 2/2020 | Tomkins et al. |
| 2020/0084131 A1 | 3/2020 | Bisht et al. |
| 2020/0092184 A1 | 3/2020 | Park et al. |
| 2020/0127903 A1 | 4/2020 | Chintala et al. |
| 2020/0137113 A1 | 4/2020 | Thomas |
| 2020/0145299 A1 | 5/2020 | Do et al. |
| 2020/0177486 A1 | 6/2020 | Bisht et al. |
| 2020/0250074 A1 | 8/2020 | Zhang et al. |
| 2020/0250307 A1 | 8/2020 | Pendyala et al. |
| 2020/0259712 A1 | 8/2020 | Jonnalagadda et al. |
| 2020/0344120 A1 | 10/2020 | Pianigiani et al. |
| 2020/0344144 A1 | 10/2020 | Lee et al. |
| 2021/0021462 A1* | 1/2021 | Chaignon ........... H04L 41/0897 |
| 2021/0344718 A1 | 11/2021 | Raleigh et al. |

OTHER PUBLICATIONS

Kharraz, et al., "Unveil: A Large-Scale, Automated Approach to Detecting Ransomware", Proceedings of the 25th USENIX Conf. on Security Symposium, Aug. 1, 2016, 16 pages.

Sivathanu, et al., "Enhancing File System Integrity Through Checksums", May 8, 2004; retrieved from https://iwww.filesystems.org/docs/nc-checksum-tr/nc-checksum.html; accessed Apr. 9, 2020, May 8, 2004, 8 pages.

* cited by examiner

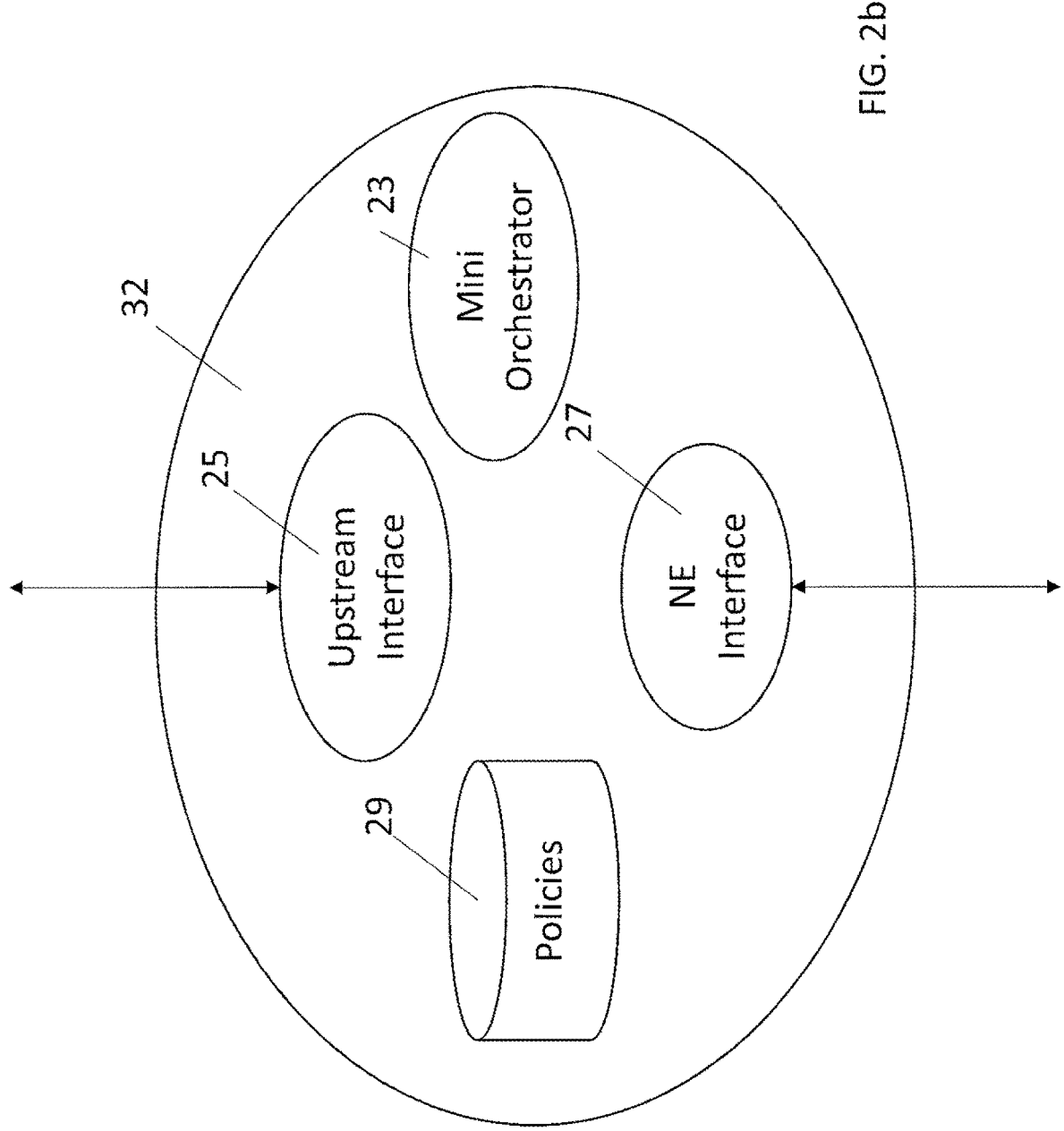

US 12,003,366 B2

SYSTEM AND METHOD FOR SDN ORCHESTRATION VALIDATION

CROSS REFERENCE TO RELATED APPLICATIONS

This application is a continuation of U.S. application Ser. No. 16/541,673, filed Aug. 15, 2019, which is incorporated herein by reference in its entirety.

TECHNICAL FIELD

This disclosure is directed to a system and method for implementing software-defined networks, and, more specifically, to utilizing a validation process to protect against the introduction of malicious code into the network.

BACKGROUND

In Software Defined Networks (SDN), so called "northbound" and "southbound" application programming interfaces (APIs) could be maliciously manipulated to command the virtual networking elements to be configured maliciously and/or to misinform the orchestrator about the actual configuration. For the purposes of this disclosure, a northbound APIs will mean those APIs that are logically positioned between the orchestrator and a SDN controller and southbound APIs will mean those APIs that are logically positioned between the SND controller and virtual network elements. Based on manual input or automatic configurations based on business rules, orchestrators typically command the SDN controller, to implement network configurations on network elements such as routers and switches. The APIs used to do so are often encrypted using transport layer security ("TLS") making the contents unreadable to entities other than the intended recipients. This creates a challenge to monitor the content of the APIs while in use.

There are several scenarios in which the lack of insight into the content of the APIs may present a risk to the integrity of the network. For example, the SDN controller may be compromised by hackers. This may manifest itself by having the SDN controller manipulate the southbound APIs by deliberately misinterpreting the commands from the orchestrator coming through the northbound API. For example, the orchestrator may want to block certain ports or protocols on the network element such as a router for security reason, but the compromised SDN controller may maliciously not block those vulnerable ports or protocols.

A hacked SDN controller may also manipulate the northbound API by deliberately misinterpreting the commands from the network element coming through the southbound API. For example, the network element such as a router wants to report that a certain port is open, or protocol is allowed/disallowed, the compromised SDN controller may alter this information, before it is passed to the orchestrator and the orchestrator may then will forward this misinformation to other network elements which may cause security breaches or network failures or other undesired scenarios.

In another unwanted scenario, a network element could be hacked to ignore the information coming from the SDN controller through the southbound API and run its own malicious code. If the orchestrator is compromised, it may ignore the business policies or needs and, using its malicious code, could send commands to the SDN controller through the northbound API creating unwanted or dangerous network configurations.

Thus, there is a need to create a system and method which will provide an additional security check in a SDN to ensure that the business policies are being implemented correctly and to uncover potential failures in the API's.

SUMMARY

The present disclosure is directed to a method including receiving a request to instantiate a network element, instantiating the network element in accordance with the request, configuring a mutable network element to simulate at least one other network element based on the receiving step, and receiving a confirmation that the network element is configured in accordance with the request. The method may further include commanding the mutable network element to test the network element prior to the network element becoming operational and to generates the confirmation based on a result of the test. The method may include wherein the test is an off-line operational test or a test based on policies. The method may further include receiving an alert instead of the confirmation if the test is a failed test. The method may further include enabling the network element to become operational.

The present disclosure is also direct to a system including an orchestrator for a software-defined network and configured to receive a request for operation of the software-defined network, a software-defined network controller in communication with the orchestrator through a northbound application programming interface, at least one network element in communication with the software defined network controller though a southbound application programming interface, the network element configured to instantiate a network element virtual function based on the request, and a mutable network element configured to receive the request and instantiate one or more additional virtual functions within the mutable network element in accordance with the request. In an aspect, the mutable network element is configured to perform a test on the network element virtual function in accordance with the request and wherein if the test is successful, the mutable network element is further configured to communicate the results of the test to the orchestrator. In an aspect, the at least one network element becomes operational in accordance with the request or if the test is not successful, the mutable network element is configured to generate an alarm message.

The system may further include a policy database containing one or more policies and wherein the mutable network element is configured to test the network element virtual function in accordance with the one or more policies or wherein the mutable network element is further configured to communicate with the at least one network element virtual function. In an aspect, the mutable network element is configured to instantiate a plurality of replicated network element functions to mimic an operation of one or more network element functions. The mutable network element may be configured to perform a test of the virtual network element function interacting with the plurality of replicated network functions. The test may include testing one of a permissible configuration or an impermissible configuration.

The present disclosure is further directed to an apparatus including an input-output interface, a processor coupled to the input-output interface wherein the processor is further coupled to a memory the memory having stored thereon executable instructions that when executed by the processor cause the processor to effectuate operations including receiving a request to instantiate a network element, creating at least one a virtual function to test the network element, testing a network element, and permitting the network element to become active based on the testing. The testing step may be based on one of the request or a policy and if the testing step is not successful, the operations may further include generating an alarm instead of performing the permitting step. The operations may further include deleting the virtual function after the permitting step is executed.

BRIEF DESCRIPTION OF THE DRAWINGS

Aspects of the herein described telecommunications network and systems and methods are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

FIG. 2b is an exemplary representation of the functionality of a mutable network element constructed in accordance with the present disclosure.

DETAILED DESCRIPTION

Figure 1A:
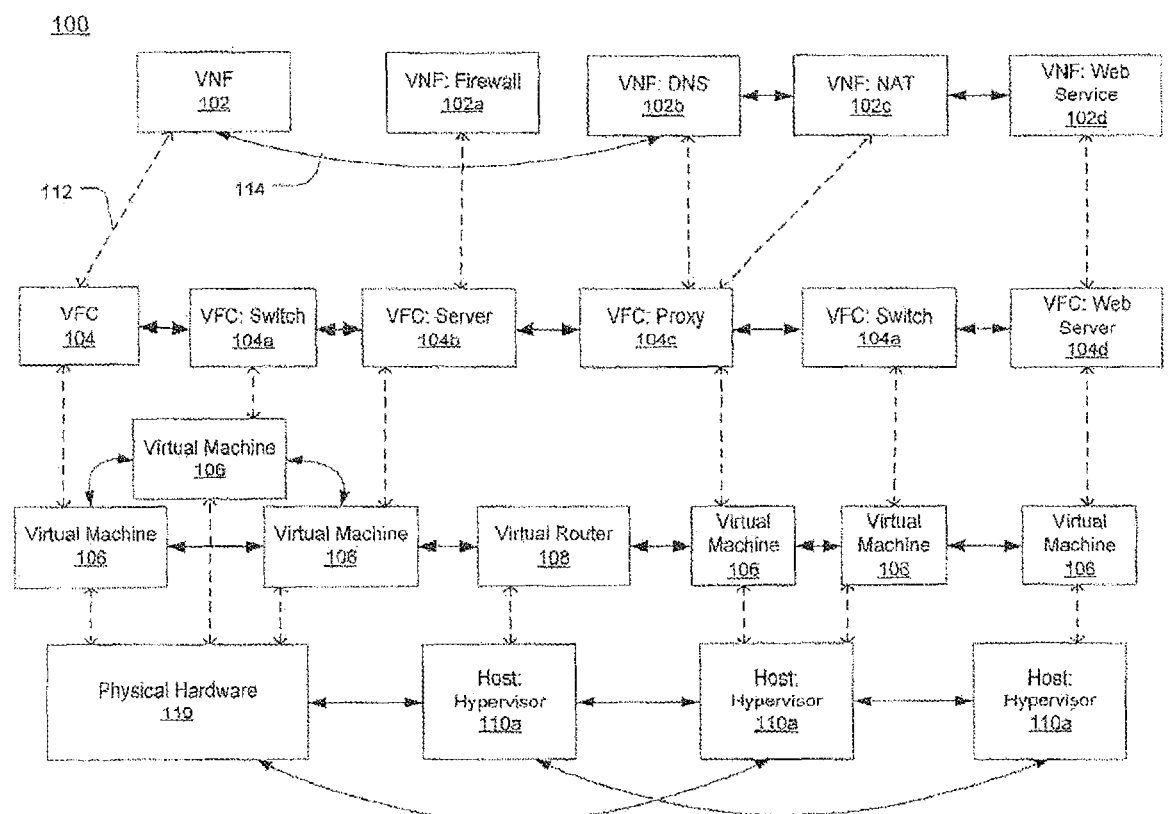
FIG. 1a is a representation of an exemplary network.

System Overview. The present disclosure includes a new and novel mutable network element (MNE), a separate dedicated network element that reads the business request and becomes a node with appropriate identifiers to communicate with the recently configured or modified network element to verify the business input is properly implemented prior to the network element going online. The system and method disclosed herein are a practical application of telecommunications technology and advance the state of the art in that telecommunications technology.

The MNE may be a generic network element that can function, for example, as a server or router with a configurable structure. An MNE may connect to all network elements to verify the business request has been correctly implemented. Once verified, the MNE will then allow the traffic flow from orchestrator back to the higher layer and permit the implementation of the desired configuration for the newly configured or modified network element.

The MNE may assume the identify of any network element. For example, the business input may request that the orchestrator configure a new network element NE X1 to allow connectivity to server having an external IP address 135.122.10.14 on a specified port using a specified protocol coming from the Internet and that the port should be set to 10 Gbps. The orchestrator will communicate this to the SDN controller via the northbound API which in turn will communicated this to the network element NE XI through the southbound API. Network element NE X1 will then implement the configuration. Before going live, the MNE will assume the personality of the server with IP address: 135.122.10.14 and will attempt to communicate with this newly configured network element NE X1 using the specified protocols with the specified port and with the specified bandwidth of 10 Gbps from the Internet to make sure the exact configuration that was requested has in fact been implemented.

In an aspect, the MNE may also host a database for security policies, for example, policies that prohibit certain configurations for a network element. The MNE may also attempt to communicate with the newly configured network element NE X1 via prohibited protocols, ports, and/or speeds and using nonwhite-listed IP addresses. These communication attempts should fail to ensure that nothing prohibited has been implemented. Thus, the MNE may perform a two-stage verification to ensure the configuration as requested is implemented and alternative configurations not requested are not implemented.

After the verification process is complete, the orchestrator may then report back to higher layers that newly requested configuration has been implemented and the newly configured network element is now active.

The MNE may be activated every time the orchestrator receives a request. If the MNE reports a discrepancy or detects a disallowed configuration, the system may generate an alert and may further isolate the system until it is checked and cleared for operation.

Operating Environment. FIG. 1a is a representation of an exemplary network 100. Network 100 may comprise an SDN—that is, network 100 may include one or more virtualized functions implemented on general purpose hardware, such as in lieu of having dedicated hardware for every network function. That is, general purpose hardware of network 100 may be configured to run virtual network elements to support communication services, such as mobility services, including consumer services and enterprise services. These services may be provided or measured in sessions.

A virtual network functions (VNFs) 102 may be able to support a limited number of sessions. Each VNF 102 may have a VNF type that indicates its functionality or role. For example, FIG. 1a illustrates a gateway VNF 102a and a policy and charging rules function (PCRF) VNF 102b. Additionally or alternatively, VNFs 102 may include other types of VNFs. Each VNF 102 may use one or more virtual machines (VMs) 104 to operate. Each VM 104 may have a VM type that indicates its functionality or role. For example, FIG. 1a illustrates a MCM VM 104a, an ASM VM 104b, and a DEP VM 104c. Additionally or alternatively, VMs 104 may include other types of VMs. Each VM 104 may consume various network resources from a hardware platform 106, such as a resource 108, a virtual central processing unit (vCPU) 108a, memory 108b, or a network interface card (NIC) 108c. Additionally or alternatively, hardware platform 106 may include other types of resources 108.

Figure 1B:
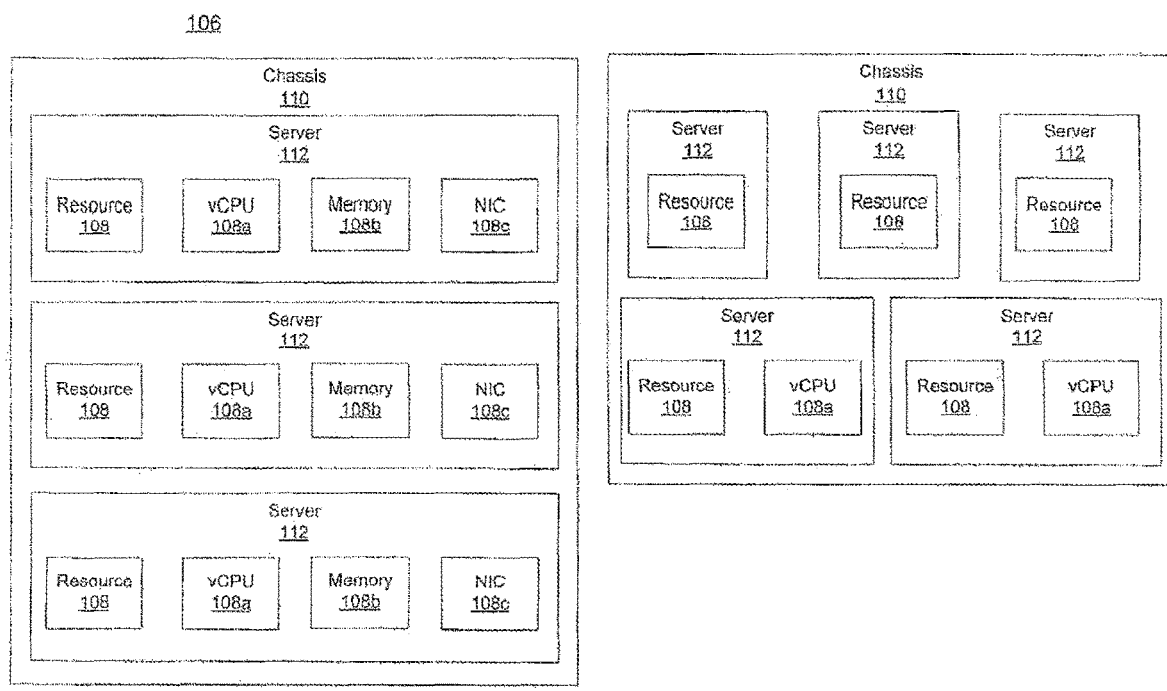
FIG. 1b is a representation of an exemplary hardware platform for a network.

While FIG. 1a illustrates resources 108 as collectively contained in hardware platform 106, the configuration of hardware platform 106 may isolate, for example, certain memory 108c from other memory 108c. FIG. 1b provides an exemplary implementation of hardware platform 106 which will be discussed in more detail below.

Figure 2A:
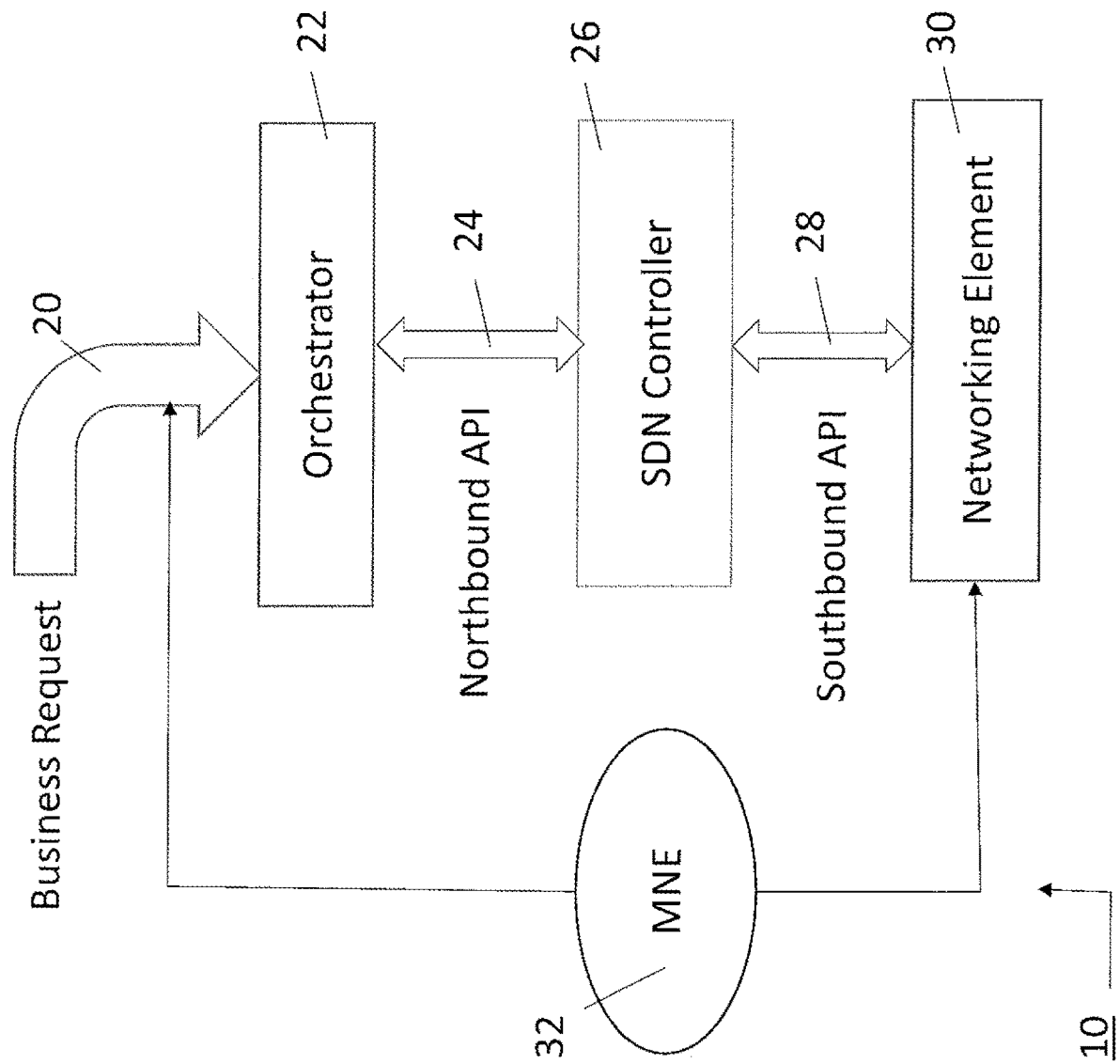
FIG. 2a is a representation of an exemplary generic network constructed in accordance with the present disclosure.

FIG. 2a shows an exemplary generic network configuration 10 of a software defined network having an orchestrator 22. An orchestrator is generally known in the art and may include the process of automatically programming the behavior of a network in accordance with a set of rules, policies and business requirements, so that the network smoothly coordinates with the hardware and the software elements to further support applications and services, in this case in a software-defined network. The orchestrator 22 may operate based on input business requests or policies, represented by input arrow 20, associated with the business operations, network operations, security, quality of service, or any of a plurality of needs of the business.

There is also shown an SDN controller 26 and networking elements 30. The SDN controller 26 may direct traffic according to policies that a network operator puts in place to automatically configure individual network devices. In a software defined network, the SDN controller 26 may facilitate automated network management and enable the integration and administration of network and business applications.

There may be one or more APIs. For example, there may be one or more a northbound APIs 24 between the orchestrator 22 and the SDN controller 26 and one or more southbound APIs between the SDN controller 26 and networking elements 30. The SDN controller communicates with applications—such as firewalls or load balancers— through the orchestrator via northbound interfaces. The SDN controller talks with individual network elements 30 using a southbound interface which may, for example, use the OpenFlow protocol. These southbound protocols allow the controller to configure network elements 30 and choose the optimal network path for application traffic.

The network elements 30 may include VM functions which may, for example, include the establishment of virtual machines implementing a variety of processing, memory or connectivity applications, including software implementation of a variety of network elements, such as gateways, RAN interface support, routers, switches, and other network elements, some of which are described in more detail below.

Also shown is a new and novel element we named the mutable network element (MNE) 32. The MNE 32 may be a generic network element that can function as a server or router with a configurable structure. The MNE 32 may be a separate dedicated virtual network element that reads the business request 20 and in response thereto, becomes a temporary node in the network with appropriate identifiers. The MNE 32 may then communicate with the recently instantiated or modified networking element 30 to verify that business request 20 has been properly implemented.

The MNE 32 may connect to any or all network elements 30 or assume the identify of one or more network elements 30 to verify the configuration. Once the configuration is verified, the MNE 32 will inform the orchestrator 22 which may then report back to the higher layer(s) for implementation of the requested configuration. The MNE 32 may assume the identity of any network element 30. As such, the MNE 32 presents a soft quarantine for any newly updated business requests 20 input into the orchestrator 22.

A sample MNE 32 is shown in FIG. 2b. There is shown an upstream interface 25 for communicating with the orchestrator 22 and to access the business rules 20. There is also shown a network element interface 27 which permits interaction with the networking elements 30. There is also shown a policy database 29 that may host a database for security policies. Such security policies may, for example, included permitted and prohibited configurations with each type and instance of a network element. The policies may also include permitted and prohibited protocols, ports, and speeds associated with the network elements. There may also be white-listed and nonwhite-listed IP addresses. Such policies may be pre-defined by an administrator on a per network element basis.

Also shown is a mini orchestrator 23. The mini orchestrator may configure the MNE 32 or other MNEs as off-line instantiations of the surrounding network elements. For example, a newly configured router may be instructed to communicate with two servers that may already exist in the network. The mini orchestrator may configure and instantiate copies of the two servers and then verify the communications between the newly configured router and the two servers is proper and consistent with the policies. The mini orchestrator may also configure and instantiate a third server which is not part of the network and then verify that the newly configured router is prohibited from communicating with the third server.

Figure 3:
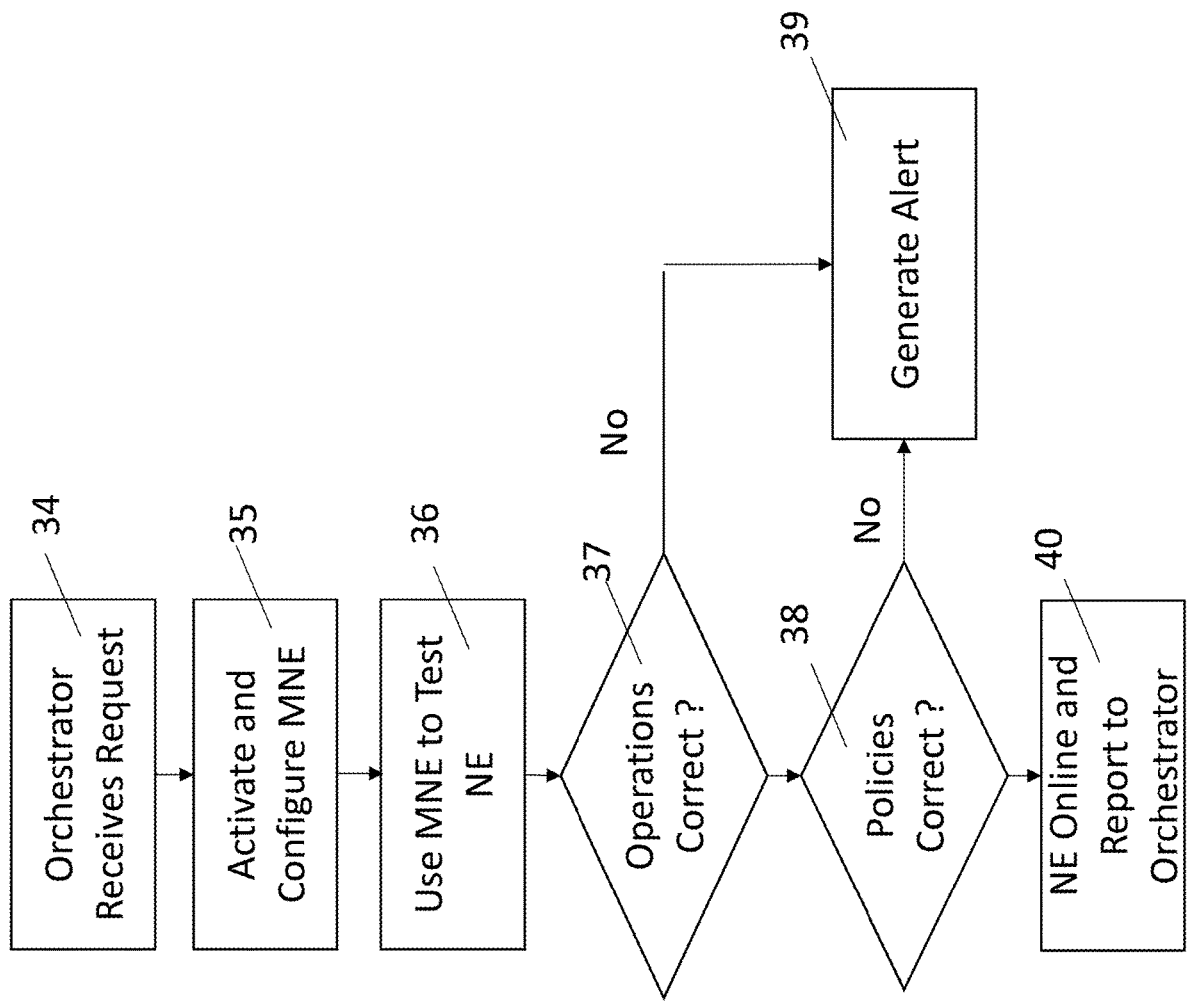
FIG. 3 is an exemplary method of operation in accordance with the present disclosure.

Operations. With reference to FIG. 3, there is shown an exemplary flow chart describing a method in accordance with the present disclosure. At 34, the orchestrator 22 receives a request from the business through the business request input 20. The request may, for example, be for the instantiation of a newly configured SDN network element such as a router, gateway or other network element. At 35, a mutable network element 32 is activated and a network element 30 is configured in accordance with the business request. At 36, the mutable network element 32 is configured to operate as if it is any network element currently operational in order to test the network element 30 instantiated by the orchestrator 22 based on the business request.

However, the newly configured network element 30 may remain isolated from the operational network until the network element 30 configuration is verified. At 37, the first step of that verification is completed in determining whether the network element 30 is operating correctly in view of the mutable network element 32 mimicking other relevant portions of the network to test the network element. This may include the testing of the network element 30 to ensure that the ports, speeds, and interconnections have been set up correctly. If the network element 30 is not operating correctly, then an alert to the system or system operator is generated at 39. If the network element 30 is operating correctly at 37, a second verification step may be performed at 38 to determine whether the security policies are implemented correctly. The security policies may test for negative situations, for example, the case in which a port is closed for security reasons may in fact be open, thereby increasing the risk of a security breach. If the security policies are not implemented correctly, then the alert to the system or system operator is generated at 39. If the security policies are implemented correctly, the newly configured network element 30 is permitted to go on-line and operational in the network and the successful instantiation is sent back to the orchestrator 22 for further reporting up the business chain.

The verification steps at 37 and 38 are described above and including an example in the section labeled "System Overview". The alerts generated at 39 may include a warning that the orchestrator is not functioning properly or that the northbound APIs or southbound APIs are corrupted.

The system and methods of the present disclosure provide a practical application that advances the state of the telecommunications technology. The system and method provide a soft quarantine of newly configured network elements 30 to reduce the risk that the network is exposed to potential security breaches. In view of the nature of the mutable network elements, it is possible to scale the configuration of software defined networks based on the business requests quickly and efficiently while at the same time reducing the risk of a security breach and thereby increase speed and reliability. The system and method permit orchestration validation within the network stream and at the same time temporarily extracting orchestration validation to the MNEs.

Device and Network Description. The characteristics of each chassis 110 and each server 112 may differ. For example, FIG. 1b illustrates that the number of servers 112 within two chasses 110 may vary. Additionally, or alternatively, the type or number of resources 110 within each server 112 may vary. In an aspect, chassis 110 may be used to group servers 112 with the same resource characteristics. In another aspect, servers 112 within the same chassis 110 may have different resource characteristics.

Given hardware platform 106, the number of sessions that may be instantiated may vary depending upon how efficiently resources 108 are assigned to different VMs 104. For example, assignment of VMs 104 to particular resources 108 may be constrained by one or more rules. For example, a first rule may require that resources 108 assigned to a particular VM 104 be on the same server 112 or set of servers 112. For example, if VM 104 uses eight vCPUs 108a, 1 GB of memory 108b, and 2 NICs 108c, the rules may require that all these resources 108 be sourced from the same server 112. Additionally, or alternatively, VM 104 may require splitting resources 108 among multiple servers 112, but such splitting may need to conform with certain restrictions. For example, resources 108 for VM 104 may be able to be split between two servers 112. Default rules may apply. For example, a default rule may require that all resources 108 for a given VM 104 must come from the same server 112.

An affinity rule may restrict assignment of resources 108 for a particular VM 104 (or a particular type of VM 104). For example, an affinity rule may require that certain VMs 104 be instantiated on (that is, consume resources from) the same server 112 or chassis 110. For example, if VNF 102 uses six MCM VMs 104a, an affinity rule may dictate that those six MCM VMs 104a be instantiated on the same server 112 (or chassis 110). As another example, if VNF 102 uses MCM VMs 104a, ASM VMs 104b, and a third type of VMs 104, an affinity rule may dictate that at least the MCM VMs 104a and the ASM VMs 104b be instantiated on the same server 112 (or chassis 110). Affinity rules may restrict assignment of resources 108 based on the identity or type of resource 108, VNF 102, VM 104, chassis 110, server 112, or any combination thereof.

An anti-affinity rule may restrict assignment of resources 108 for a particular VM 104 (or a particular type of VM 104). In contrast to an affinity rule—which may require that certain VMs 104 be instantiated on the same server 112 or chassis 110—an anti-affinity rule requires that certain VMs 104 be instantiated on different servers 112 (or different chasses 110). For example, an anti-affinity rule may require that MCM VM 104a be instantiated on a particular server 112 that does not contain any ASM VMs 104b. As another example, an anti-affinity rule may require that MCM VMs 104a for a first VNF 102 be instantiated on a different server 112 (or chassis 110) than MCM VMs 104a for a second VNF 102. Anti-affinity rules may restrict assignment of resources 108 based on the identity or type of resource 108, VNF 102, VM 104, chassis 110, server 112, or any combination thereof.

Within these constraints, resources 108 of hardware platform 106 may be assigned to be used to instantiate VMs 104, which in turn may be used to instantiate VNFs 102, which in turn may be used to establish sessions. The different combinations for how such resources 108 may be assigned may vary in complexity and efficiency. For example, different assignments may have different limits of the number of sessions that can be established given a particular hardware platform 106.

For example, consider a session that may require gateway VNF 102a and PCRF VNF 102b. Gateway VNF 102a may require five VMs 104 instantiated on the same server 112, and PCRF VNF 102b may require two VMs 104 instantiated on the same server 112. (Assume, for this example, that no affinity or anti-affinity rules restrict whether VMs 104 for PCRF VNF 102b may or must be instantiated on the same or different server 112 than VMs 104 for gateway VNF 102a.) In this example, each of two servers 112 may have sufficient resources 108 to support 10 VMs 104. To implement sessions using these two servers 112, first server 112 may be instantiated with 10 VMs 104 to support two instantiations of gateway VNF 102a, and second server 112 may be instantiated with 9 VMs: five VMs 104 to support one instantiation of gateway VNF 102a and four VMs 104 to support two instantiations of PCRF VNF 102b. This may leave the remaining resources 108 that could have supported the tenth VM 104 on second server 112 unused (and unusable for an instantiation of either a gateway VNF 102a or a PCRF VNF 102b). Alternatively, first server 112 may be instantiated with 10 VMs 104 for two instantiations of gateway VNF 102a and second server 112 may be instantiated with 10 VMs 104 for five instantiations of PCRF VNF 102b, using all available resources 108 to maximize the number of VMs 104 instantiated.

Consider, further, how many sessions each gateway VNF 102a and each PCRF VNF 102b may support. This may factor into which assignment of resources 108 is more efficient. For example, consider if each gateway VNF 102a supports two million sessions, and if each PCRF VNF 102b supports three million sessions. For the first configuration—three total gateway VNFs 102a (which satisfy the gateway requirement for six million sessions) and two total PCRF VNFs 102b (which satisfy the PCRF requirement for six million sessions)—would support a total of six million sessions. For the second configuration—two total gateway VNFs 102a (which satisfy the gateway requirement for four million sessions) and five total PCRF VNFs 102b (which satisfy the PCRF requirement for 15 million sessions)—would support a total of four million sessions. Thus, while the first configuration may seem less efficient looking only at the number of available resources 108 used (as resources 108 for the tenth possible VM 104 are unused), the second configuration is more efficient from the perspective of being the configuration that can support more the greater number of sessions.

To solve the problem of determining a capacity (or, number of sessions) that can be supported by a given hardware platform 105, a given requirement for VNFs 102 to support a session, a capacity for the number of sessions each VNF 102 (e.g., of a certain type) can support, a given requirement for VMs 104 for each VNF 102 (e.g., of a certain type), a give requirement for resources 108 to support each VM 104 (e.g., of a certain type), rules dictating the assignment of resources 108 to one or more VMs 104 (e.g., affinity and anti-affinity rules), the chasses 110 and servers 112 of hardware platform 106, and the individual resources 108 of each chassis 110 or server 112 (e.g., of a certain type), an integer programming problem may be formulated.

First, a plurality of index sets may be established. For example, index set L may include the set of chasses 110. For example, if a system allows up to 6 chasses 110, this set may be:

L={1, 2, 3, 4, 5, 6}, where l is an element of L.

Another index set J may include the set of servers 112. For example, if a system allows up to 16 servers 112 per chassis 110, this set may be:

J={1, 2, 3, . . . , 16}, where j is an element of J.

As another example, index set K having at least one element k may include the set of VNFs 102 that may be considered. For example, this index set may include all types of VNFs 102 that may be used to instantiate a service. For example, let K={GW, PCRF} where GW represents gateway VNFs 102*a* and PCRF represents PCRF VNFs 102*b*.

Another index set I(k) may equal the set of VMs 104 for a VNF 102 *k*. Thus, let I(GW)={MCM, ASM, TOM, WSM, CCM, DCM} represent VMs 104 for gateway VNF 102*a*, where MCM represents MCM VM 104*a*, ASM represents ASM VM 104*b*, and each of IOM, WSM, CCM, and DCM represents a respective type of VM 104. Further, let I(PCRF)={DEP, DIR, POL, SES, MAN} represent VMs 104 for PCRF VNF 102*b*, where DEP represents DEP VM 104*c* and each of DIR, POL, SES, and MAN represent a respective type of VM 104.

Another index set V may include the set of possible instances of a given VM 104. For example, if a system allows up to 20 instances of VMs 102, this set may be: V={1, 2, 3, . . . , 20}, where v is an element of V.

In addition to the sets, the integer programming problem may include additional data. The characteristics of VNFs 102, VMs 104, chasses 110, or servers 112 may be factored into the problem. This data may be referred to as parameters. For example, for given VNF 102 *k*, the number of sessions that VNF 102 *k* can support may be defined as a function S(k). In an aspect, for an element k of set K, this parameter may be represented by S(k)>=0; is a measurement of the number of sessions k can support. Returning to the earlier example where gateway VNF 102*a* may support 2 million sessions, then this parameter may be S(GW)=2,000,000.

VM 104 modularity may be another parameter in the integer programming problem. VM 104 modularity may represent the VM 104 requirement for a type of VNF 102. For example, fork that is an element of set K and i that is an element of set I, each instance of VNF k may require M(k, i) instances of VMs 104. For example, recall the example where I(GW)={MCM, ASM, IOM, WSM, CCM, DCM}. In an example, M(GW, I(GW)) may be the set that indicates the number of each type of VM 104 that may be required to instantiate gateway VNF 102*a*. For example, M(GW, I(GW))={2, 16, 4, 4, 2, 4} may indicate that one instantiation of gateway VNF 102*a* may require two instantiations of MCM VMs 104*a*, 16 instantiations of ACM VM 104*b*, four instantiations of TOM VM 104, four instantiations of WSM VM 104, two instantiations of CCM VM 104, and four instantiations of DCM VM 104.

Another parameter may indicate the capacity of hardware platform 106. For example, a parameter C may indicate the number of vCPUs 108*a* required for each VM 104 type i and for each VNF 102 type k. For example, this may include the parameter C(k, i). For example, if MCM VM 104*a* for gateway VNF 102*a* requires 20 vCPUs 108*a*, this may be represented as C(GW, MCM)=20.

However, given the complexity of the integer programming problem—the numerous variables and restrictions that must be satisfied—implementing an algorithm that may be used to solve the integer programming problem efficiently, without sacrificing optimality, may be difficult.

Figure 4:
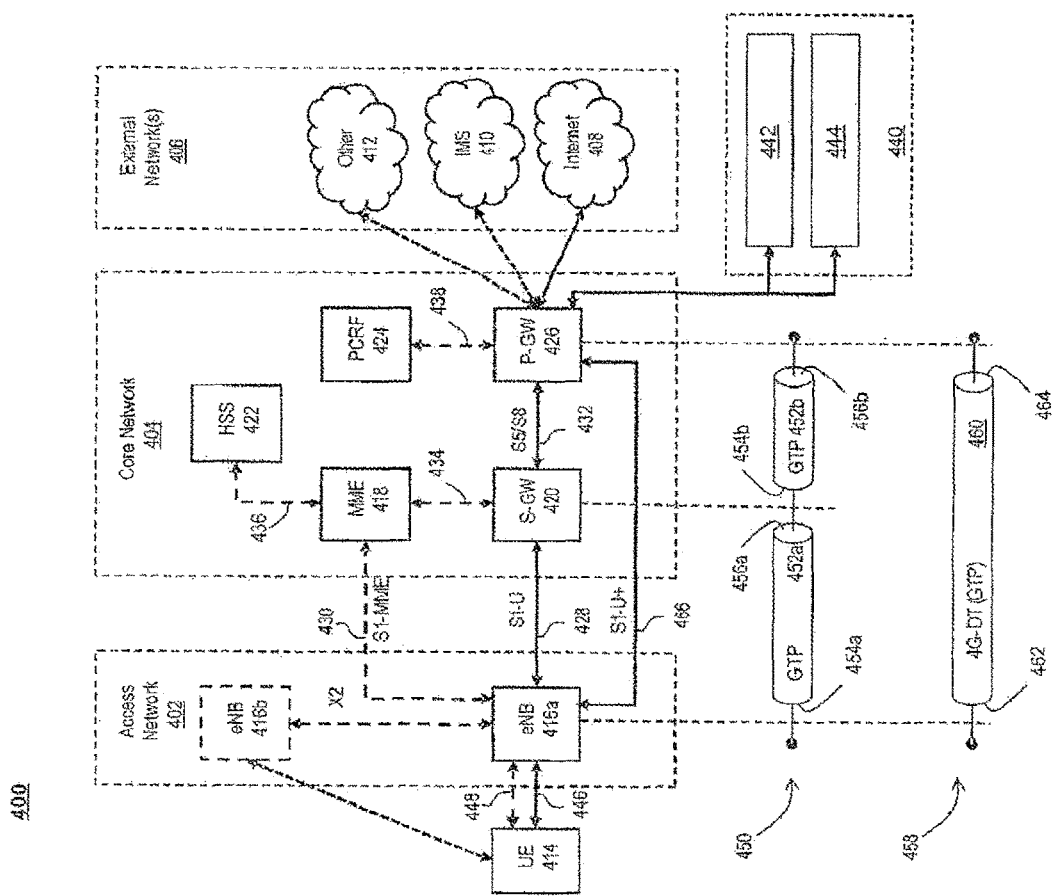
FIG. 4 depicts an exemplary communication system that provide wireless telecommunication services over wireless communication networks that may be at least partially implemented as an SDN.

FIG. 4 illustrates a functional block diagram depicting one example of an LTE-EPS network architecture 400 that may be at least partially implemented as an SDN. Network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. LTE-EPS network architecture 400 may include an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like. In an aspect, access network 402, core network 404, or external network 405 may include or communicate with network 100.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416*a*, 416*b*. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416a.

HSS 422 can manage subscription-related information for a user of UE 414. For example, tHSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring and/or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively, or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 4. In other words, either or both of access network 402 and the core network 404 can include additional network elements that are not shown, such as various routers, switches and controllers. In addition, although FIG. 4 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 4. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 100, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two-tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416*a* and PGW 426, by way of SGW 420. That is, SGW 420 can serve a relay function, by relaying packets between two tunnel endpoints 416*a*, 426. In other scenarios, direct tunneling solution 458 can forward user data packets between eNB 416*a* and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual basis. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416*a*. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 5:
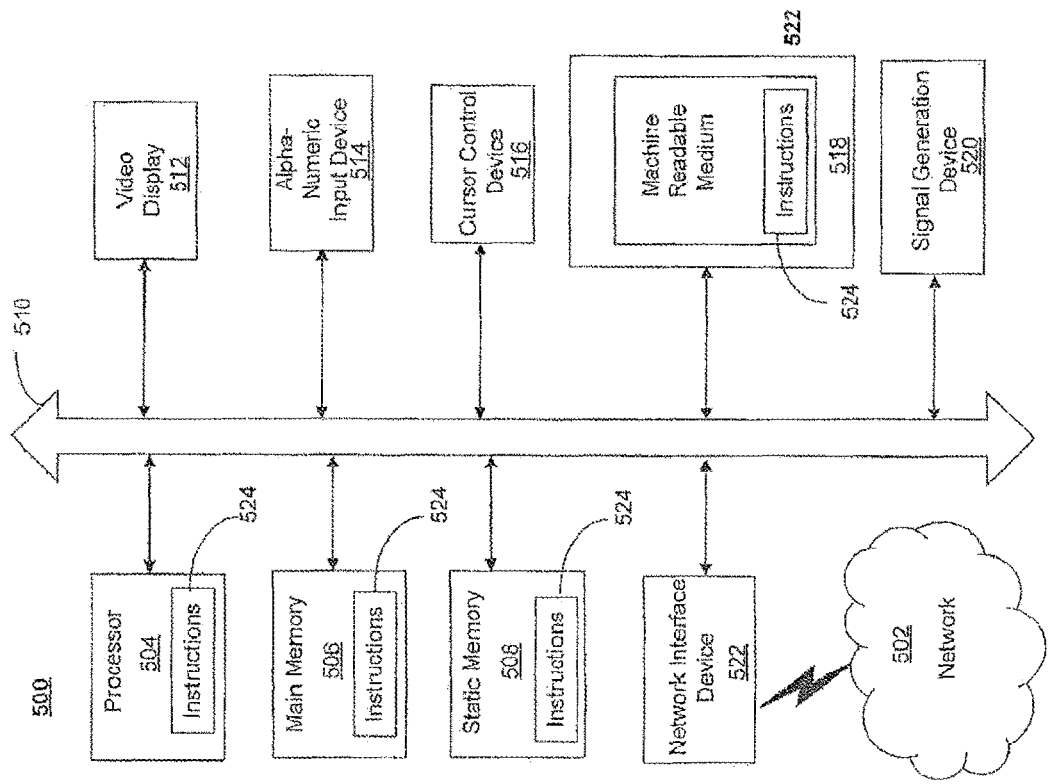
FIG. 5 depicts an exemplary diagrammatic representation of a machine in the form of a computer system.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, UE 414, eNB 416, MME 418, SGW 420, HSS 422, PCRF 424, PGW 426 and other devices of FIGS. 1, 2, and 4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid-state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6:
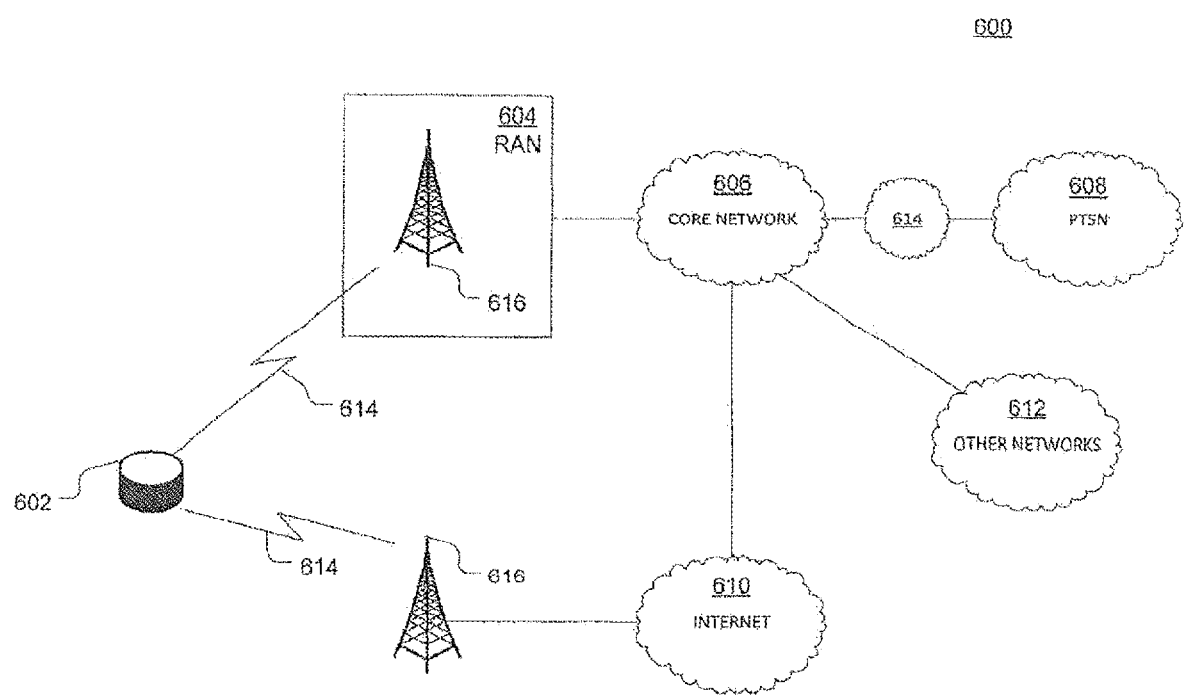
FIG. 6 is an exemplary diagrammatic representation of a cellular communications network.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise drone 102, a mobile device, network device 300, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 6, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 7:
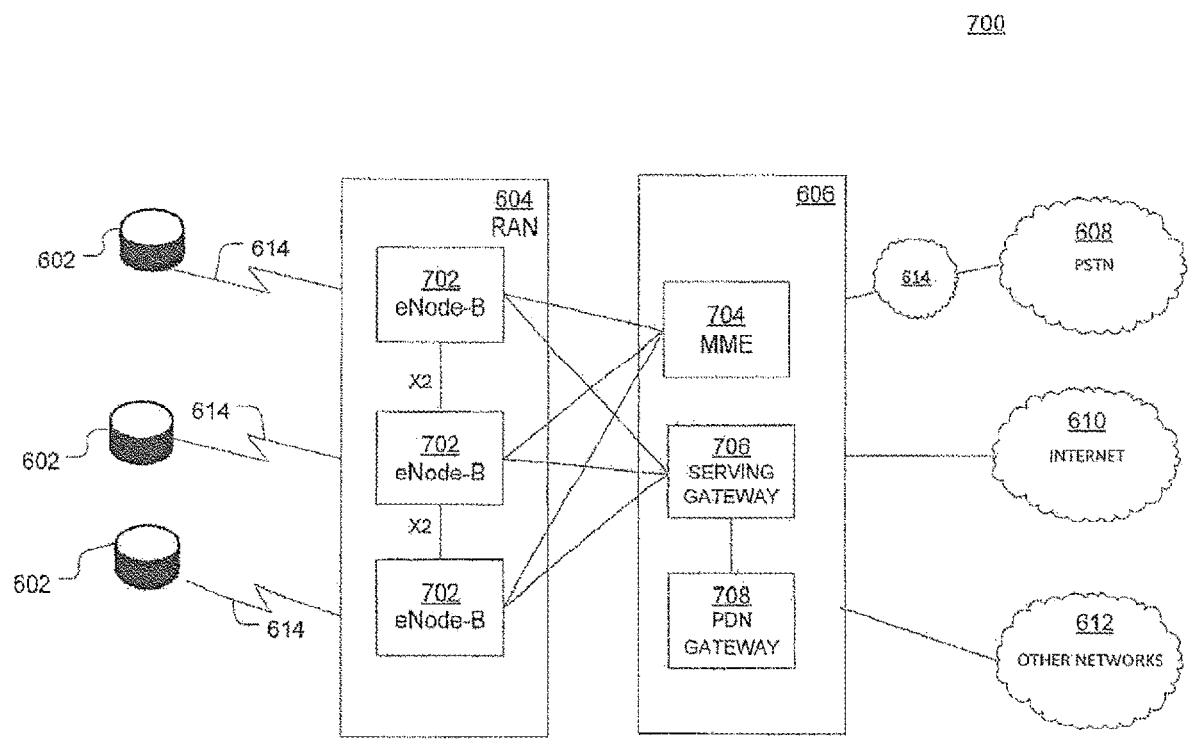
FIG. 7 is an example system including RAN and core network functions.

FIG. 7 is an example system 100 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell (not shown) and may be configured to handle radio resource management decisions, handover decisions, scheduling of users in the uplink or downlink, or the like. As shown in FIG. 7 eNode-Bs 702 may communicate with one another over an X2 interface.

Core network 606 shown in FIG. 7 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

Figure 8:
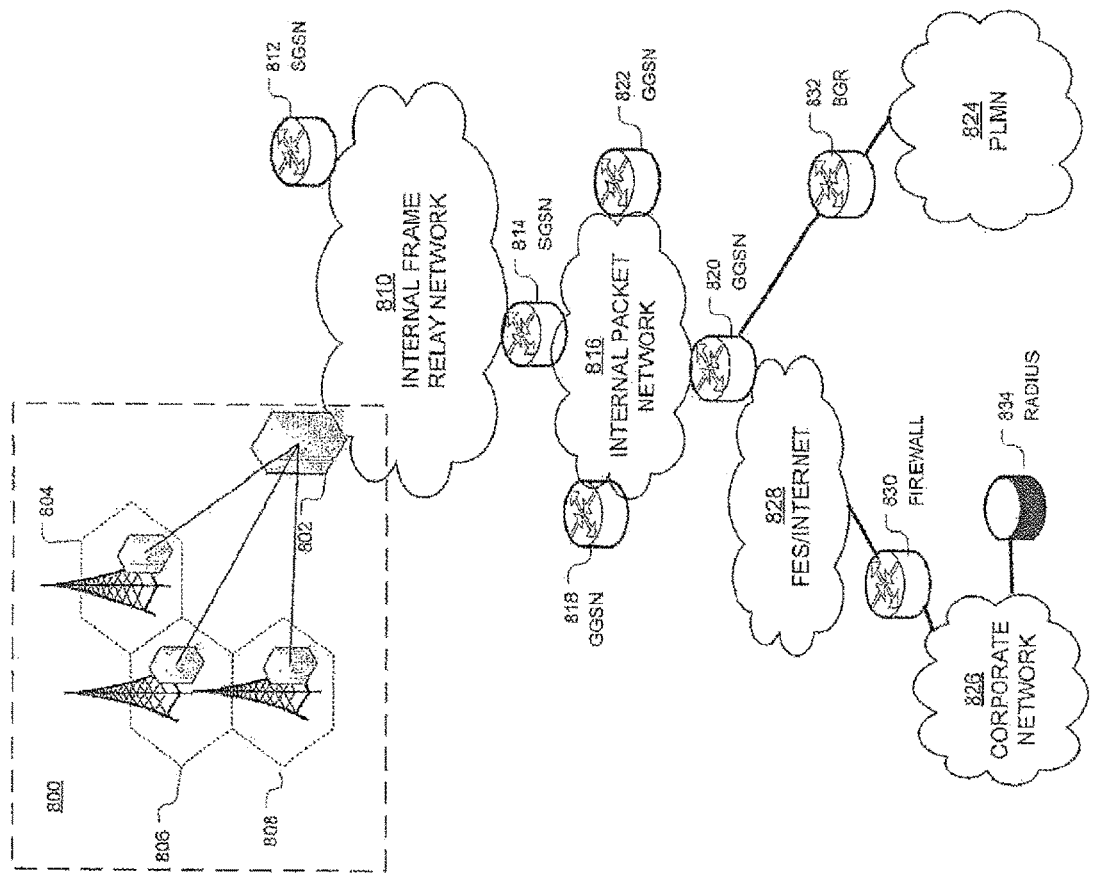
FIG. 8 depicts an overall block diagram of an example packet-based mobile cellular network environment.

FIG. 8 depicts an overall block diagram of an example packet-based mobile cellular network environment, such as a GPRS network as described herein. In the example packet-based mobile cellular network environment shown in FIG. 8, there are a plurality of base station subsystems (BSS) 800 (only one is shown), each of which comprises a base station controller (BSC) 802 serving a plurality of BTSs, such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a service GPRS support nodes (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822. As illustrated, SGSN 814 and GGSNs 818, 820, 822 are part of internal packet network 816. GGSNs 818, 820, 822 mainly provide an interface to external IP networks such as PLMN 824, corporate intranets/internets 826, or Fixed-End System (FES) or the public Internet 828. As illustrated, subscriber corporate network 826 may be connected to GGSN 820 via a firewall 830. PLMN 824 may be connected to GGSN 820 via a boarder gateway router (BGR) 832. A Remote Authentication Dial-In User Service (RADIUS) server 834 may be used for caller authentication when a user calls corporate network 826.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 9:
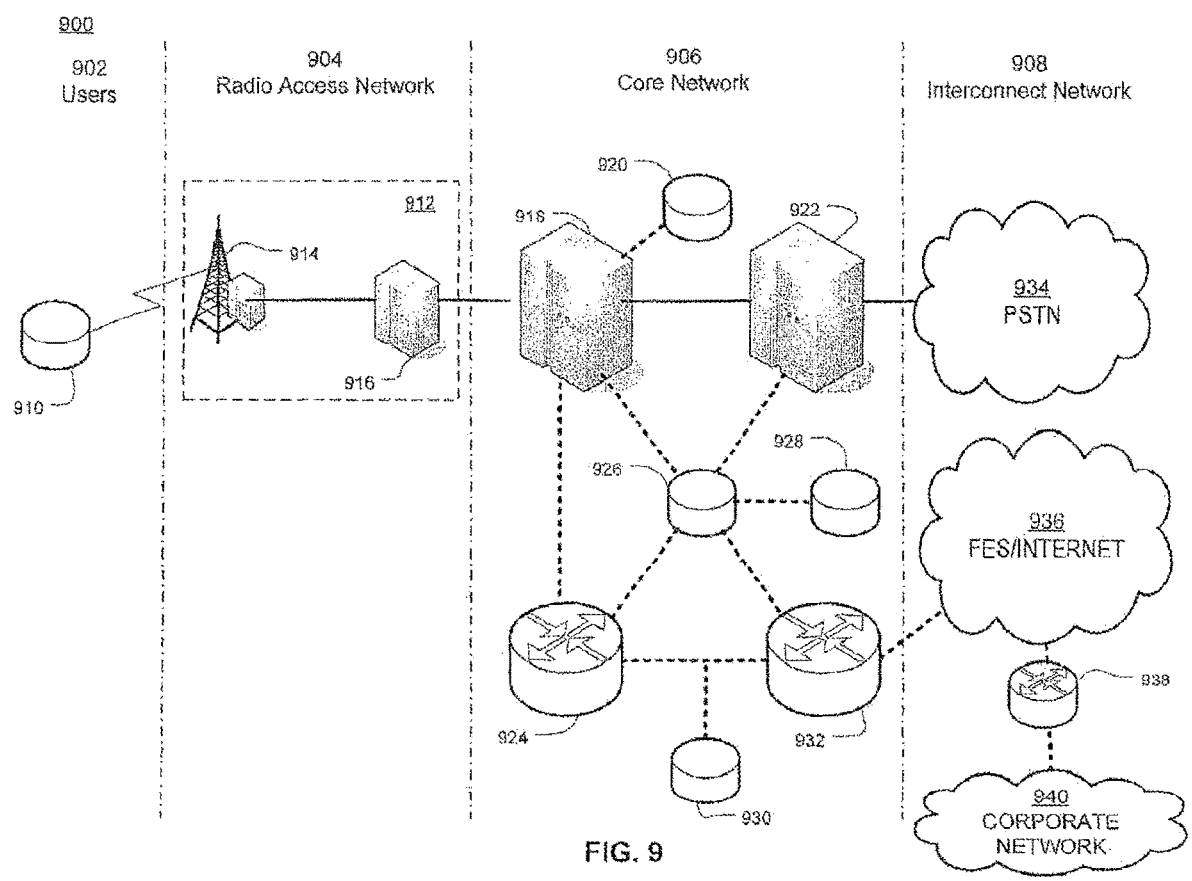
FIG. 9 illustrates an architecture of a typical GPRS network

FIG. 9 illustrates an architecture of a typical GPRS network 900 as described herein. The architecture depicted in FIG. 9 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 9. In an example, device 910 comprises a communications device (e.g., mobile device 102, mobile positioning center 116, network device 300, any of detected devices 500, second device 508, access device 604, access device 606, access device 608, access device 610 or the like, or any combination thereof). Radio access network 904 comprises a plurality of BSSs such as BSS 912, which includes a BTS 914 and a BSC 916. Core network 906 may include a host of various network elements. As illustrated in FIG. 9, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 9, interconnect network 908 comprises a PSTN 934, an FES/Internet 936, a firewall 1038, or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 9, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1038, to reach corporate network 940.

Figure 10:
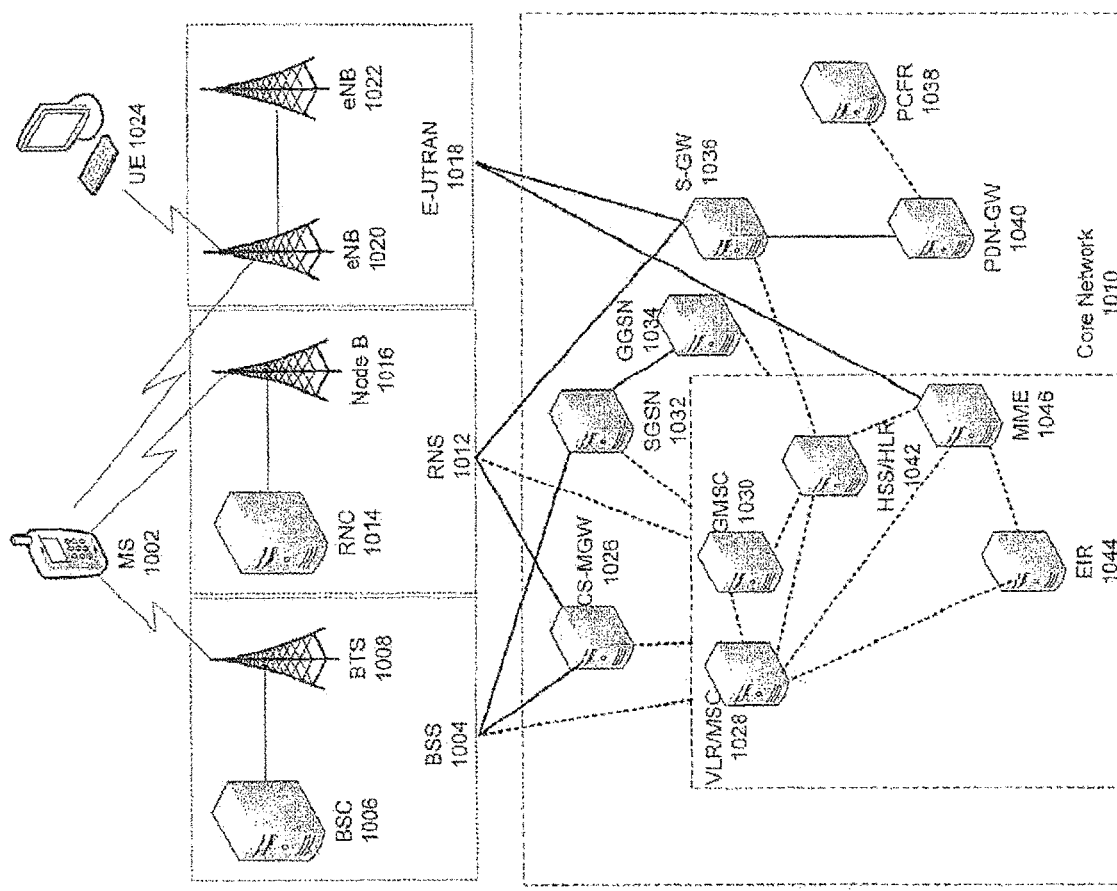
FIG. 10 illustrates a PLMN block diagram view of an example architecture that may be replaced by a telecommunications system

FIG. 10 illustrates a PLMN block diagram view of an example architecture that may be replaced by a telecommunications system. In FIG. 10, solid lines may represent user traffic signals, and dashed lines may represent support signaling. MS 1002 is the physical equipment used by the PLMN subscriber. For example, drone 102, network device 300, the like, or any combination thereof may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNB s. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically, MS 1002 may communicate with any or all of BSS 1004, RNS 1012, or E-UTRAN 1018. In an illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1026 is part of core network 1010 and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location information such as, but not limited to, GGSN address for each GGSN 1034 where an active PDP exists. GGSN 1034 may implement a location register function to store subscriber data it receives from SGSN 1032 such as subscription or location information.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS 1042 is a database for user information and stores subscription data regarding MS 1002 or UE 1024 for handling calls or data sessions. Networks may contain one HSS 1042 or more if additional resources are required. Example data stored by HSS 1042 include, but is not limited to, user identification, numbering or addressing information, security information, or location information. HSS 1042 may also provide call or session establishment procedures in both the PS and CS domains.

VLR/MSC Server 1028 provides user location functionality. When MS 1002 enters a new network location, it begins a registration procedure. A MSC server for that location transfers the location information to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. GMSC server 1030 may serve as a connection to alternate GMSC servers for other MSs in larger networks.

EIR 1044 is a logical element which may store the IMEI for MS 1002. User equipment may be classified as either "white listed" or "black listed" depending on its status in the network. If MS 1002 is stolen and put to use by an unauthorized user, it may be registered as "black listed" in EIR 1044, preventing its use on the network. A MME 1046 is a control node which may track MS 1002 or UE 1024 if the devices are idle. Additional functionality may include the ability of MME 1046 to contact idle MS 1002 or UE 1024 if retransmission of a previous session is required.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used, or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

The invention claimed is:

1. A device comprising:
   a processing system including a processor; and
   a memory that stores executable instructions that, when executed by the processing system, facilitate performance of operations comprising:
   instantiating a first network element in a communication network, the communication network comprising a plurality of operational elements; and
   configuring a mutable network element in the communication network to simulate a second network element in the communication network resulting in a simulated network element, wherein the mutable network element comprises a dedicated network element separate from the plurality of operational elements, wherein the mutable network element comprises a server, a router, or a combination thereof with a configurable structure, wherein the simulated network element is configured as a temporary node in the communication network,
   wherein in accordance with the configuring, the mutable network element assumes an identity of the second network element to perform a test of the first network element in the communication network prior to the first network element becoming operational in the communication network, wherein the first network element is isolated from the plurality of operational elements until a configuration of the first network element is verified.

2. The device of claim 1, wherein the operations further comprise receiving a request to instantiate the first network element in the communication network, wherein the mutable network element is configured in accordance with the request.

3. The device of claim 2, wherein the operations further comprise receiving, responsive to test results indicating a successful test, a confirmation that the first network element is configured in accordance with the request.

4. The device of claim 1, wherein the operations further comprise receiving an alert responsive to test results indicating a failed test.

5. The device of claim 1, wherein the mutable network element hosts a database for at least one security policy that lists at least one prohibited protocol associated with the first network element.

6. The device of claim 1, wherein the operations further comprise enabling the first network element to become operational.

7. The device of claim 1, wherein the test is an off-line operational test.

8. The device of claim 1, wherein the mutable network element is further configured to communicate with the first network element.

9. The device of claim 1, wherein the mutable network element is configured to instantiate a plurality of replicated virtual functions on the communication network to mimic an operation of one or more network element functions.

10. The device of claim 9, wherein the test of the first network element comprises interaction with the plurality of replicated virtual functions.

11. A method comprising:
instantiating, by a processing system including a processor, a first network element in a communication network, the communication network comprising a plurality of operational elements; and
configuring, by the processing system, a mutable network element in the communication network to simulate a second network element in the communication network resulting in a simulated network element, wherein the mutable network element comprises a dedicated network element separate from the plurality of operational elements, wherein the simulated network element is configured as a temporary node in the communication network,
wherein in accordance with the configuring, the mutable network element assumes an identity of the second network element to perform a test of the first network element in isolation from the plurality of operational elements prior to the first network element becoming operational in the communication network, wherein the mutable network element hosts a database for at least one security policy that lists at least one prohibited protocol associated with the first network element.

12. The method of claim 11, wherein the first network element is isolated from the plurality of operational elements until a configuration of the first network element is verified.

13. The method of claim 11, further comprising receiving, by the processing system, a request to instantiate the first network element in the communication network, wherein the mutable network element is configured in accordance with the request.

14. The method of claim 13, further comprising receiving, by the processing system responsive to test results indicating a successful test, a confirmation that the first network element is configured in accordance with the request.

15. The method of claim 11, further comprising receiving, by the processing system, an alert responsive to test results indicating a failed test.

16. A non-transitory machine-readable medium comprising executable instructions that, when executed by a processing system including a processor, facilitate performance of operations comprising:
instantiating a first network element in a network comprising a plurality of operational elements; and
configuring a mutable network element in the network to simulate a second network element in the network resulting in a simulated network element, wherein the mutable network element comprises a dedicated network element separate from the plurality of operational elements, wherein the simulated network element is configured as a temporary node in the network,
wherein in accordance with the configuring, the mutable network element assumes an identity of the second network element to perform a test of the first network element in the network prior to the first network element becoming operational in the network, wherein the first network element is isolated from the plurality of operational elements until a configuration of the first network element is verified, wherein the mutable network element hosts a database for at least one security policy that lists at least one prohibited protocol associated with the first network element.

17. The non-transitory machine-readable medium of claim 16, wherein the network comprises a communication network, and wherein the mutable network element is further configured to communicate with the first network element.

18. The non-transitory machine-readable medium of claim 16, wherein the operations further comprise receiving a request to instantiate the first network element in the network, wherein the mutable network element is configured in accordance with the request.

19. The non-transitory machine-readable medium of claim 16, wherein the operations further comprise enabling the first network element to become operational.

20. The non-transitory machine-readable medium of claim 16, wherein the mutable network element comprises a server, a router, or a combination thereof with a configurable structure.

* * * * *

UNITED STATES PATENT AND TRADEMARK OFFICE
CERTIFICATE OF CORRECTION

| | |
|---|---|
| PATENT NO. | : 12,003,366 B2 |
| APPLICATION NO. | : 17/939072 |
| DATED | : June 4, 2024 |
| INVENTOR(S) | : Dylan Chamberlain Reid and Joseph Soryal |

It is certified that error appears in the above-identified patent and that said Letters Patent is hereby corrected as shown below:

In the Specification

Column 9, Line 25 delete "TOM" and insert --IOM--.

Signed and Sealed this
Ninth Day of July, 2024

Katherine Kelly Vidal
*Director of the United States Patent and Trademark Office*